No. 801,706. PATENTED OCT. 10, 1905.
C. F. BEAKBANE & W. E. HIPKINS.
AUTOMATIC WEIGHING MACHINE.
APPLICATION FILED JUNE 16, 1904.

4 SHEETS—SHEET 1.

Witnesses.
Lillie M. Perry.
B. H. Loucks.

Inventors.
Charles Frankland Beakbane
William Edward Hipkins
by Finckel & Finckel
Attorneys.

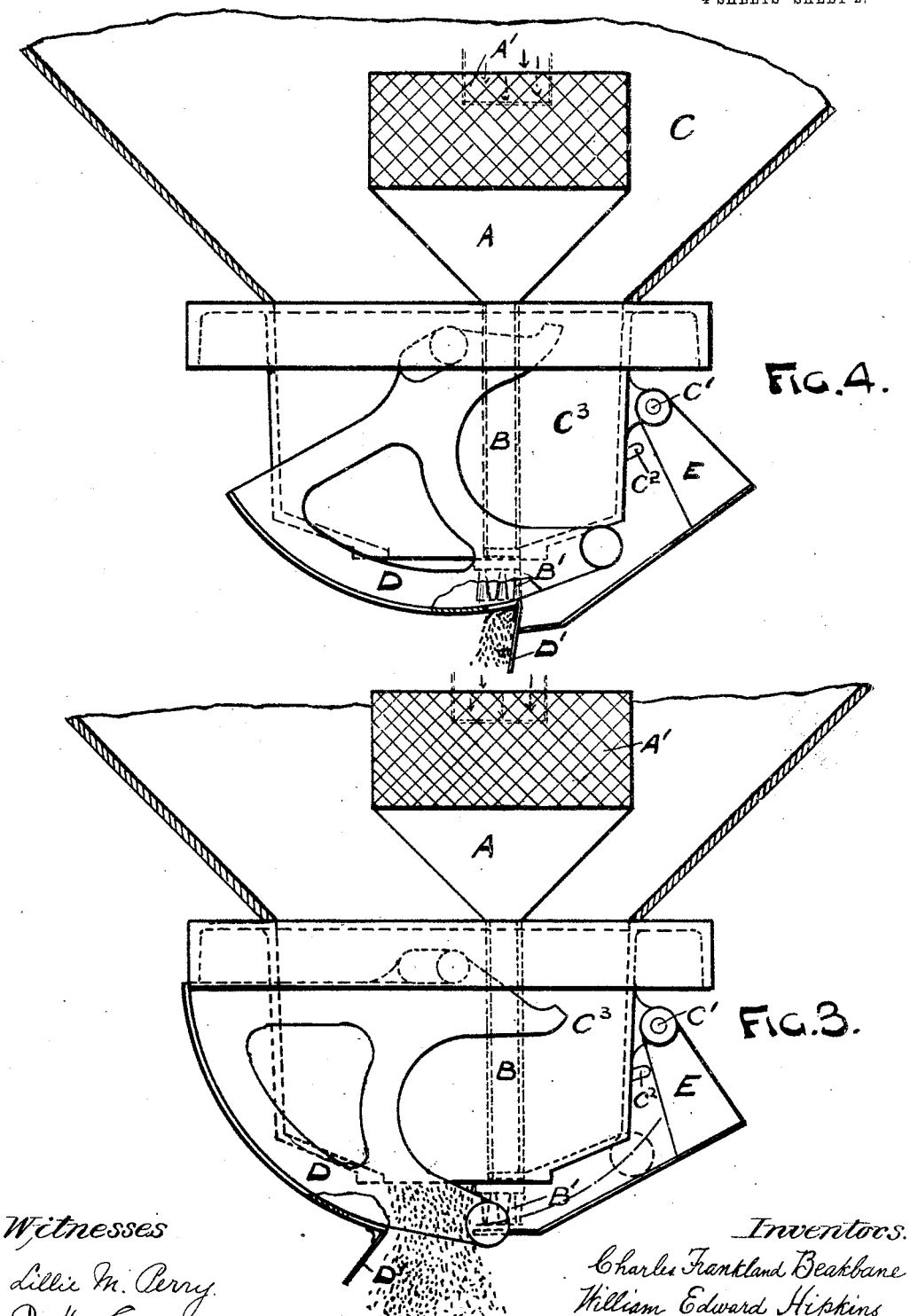

No. 801,706. PATENTED OCT. 10, 1905.
C. F. BEAKBANE & W. E. HIPKINS.
AUTOMATIC WEIGHING MACHINE.
APPLICATION FILED JUNE 16, 1904.
4 SHEETS—SHEET 3.
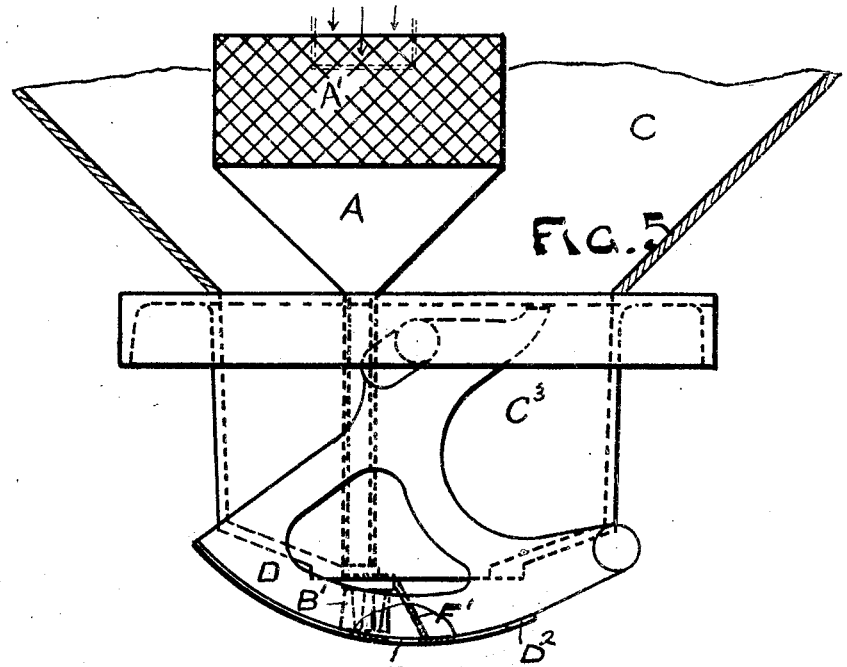
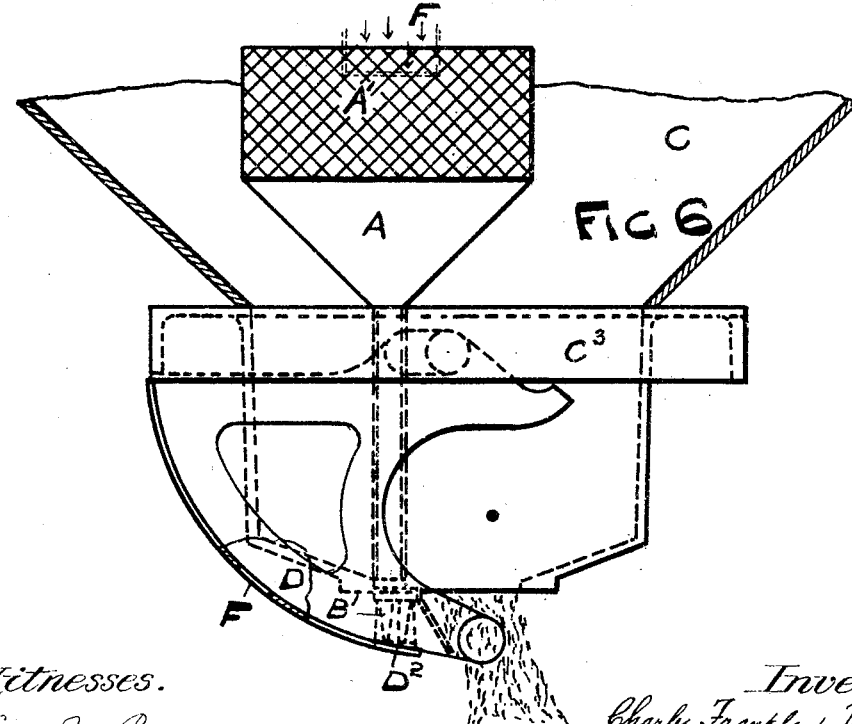
Witnesses.
Lillie M. Perry
B. H. Couchs
Inventors.
Charles Frankland Beakbane
William Edward Hipkins
by Finckel & Finckel
Attorneys

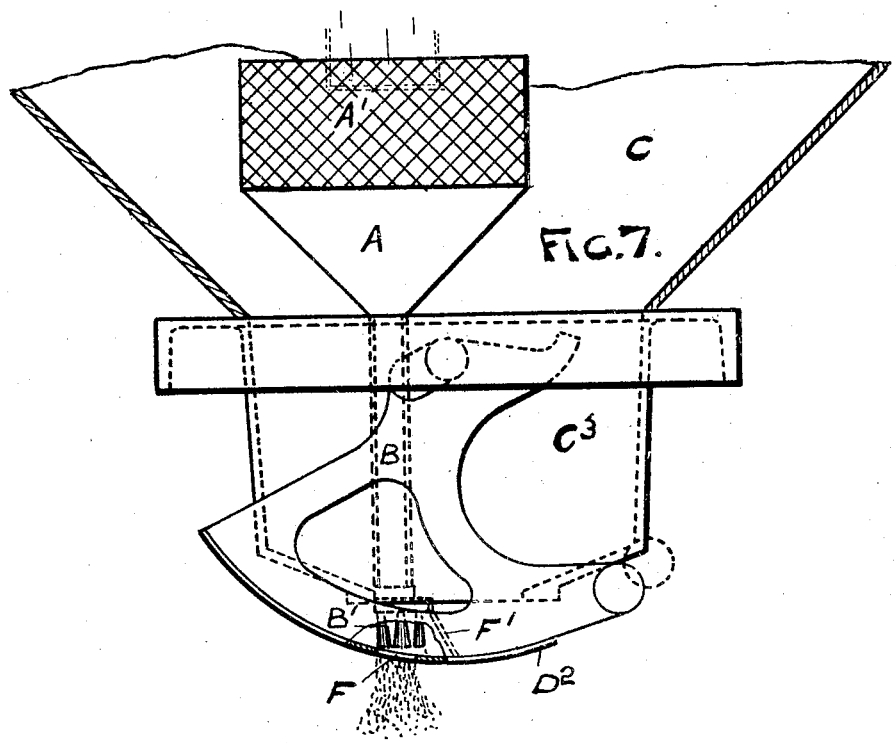
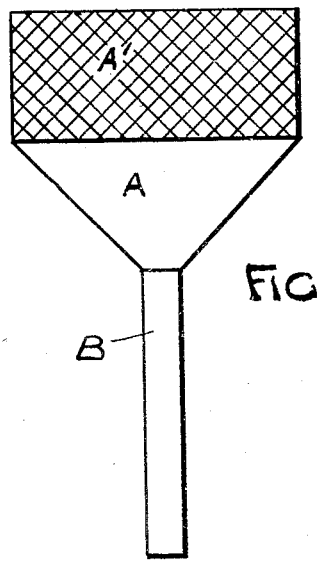
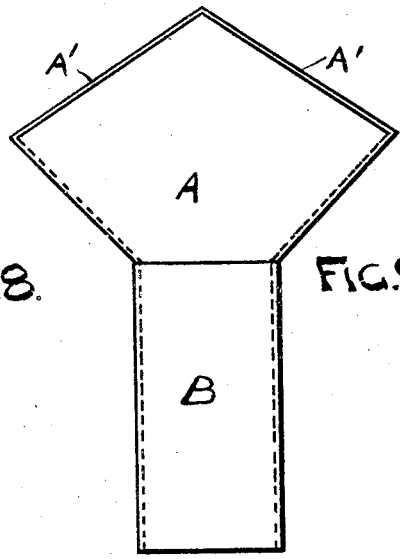

UNITED STATES PATENT OFFICE.

CHARLES FRANKLAND BEAKBANE AND WILLIAM EDWARD HIPKINS, OF BIRMINGHAM, ENGLAND.

AUTOMATIC WEIGHING-MACHINE.

No. 801,706. Specification of Letters Patent. Patented Oct. 10, 1905.

Application filed June 16, 1904. Serial No. 212,859.

*To all whom it may concern:*

Be it known that we, CHARLES FRANKLAND BEAKBANE, engineer, of Elmdon Road, Acocks Green, Birmingham, and WILLIAM EDWARD HIPKINS, of the firm of W. & T. Avery, Limited, Soho Foundry, Birmingham, in the county of Warwick, England, manufacturers of weighing apparatus, both subjects of King Edward of Great Britain and Ireland, have invented a certain new Improvement in or Relating to Automatic Weighing-Machines for Weighing Grain and the Like; and we do hereby declare the following to be a full, clear, and exact description of the invention, such as would enable others skilled in the art to which it appertains to make and use the same.

To insure accurate weighments in automatic weighing-machines, it is imperative that the amount of grain or other flowing material held in suspension during the dribble period should be constant and equal, so that the amount of material in suspension when the final cut off is accomplished shall in each weighment be exactly alike. To obviate the liability of insufficiency of a constant and equal supply during the dribble period is the object of our invention.

Our improvement consists of an arrangement of a supplementary or subsidiary hopper for insuring a constant flow of material during the final feed or "dribble," as it is technically known in connection with automatic weighing-machines.

Our said invention will be more clearly understood by reference to the accompanying drawings, the same letters of reference indicating similar parts throughout.

Figure 1:
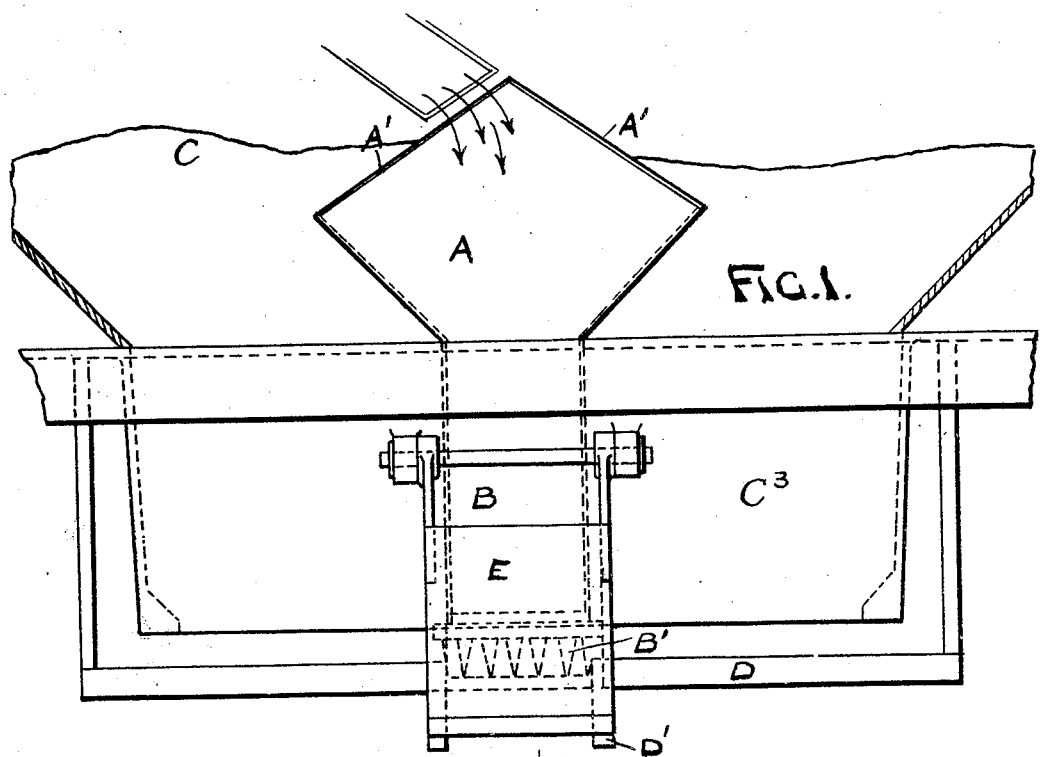
Figure 2:
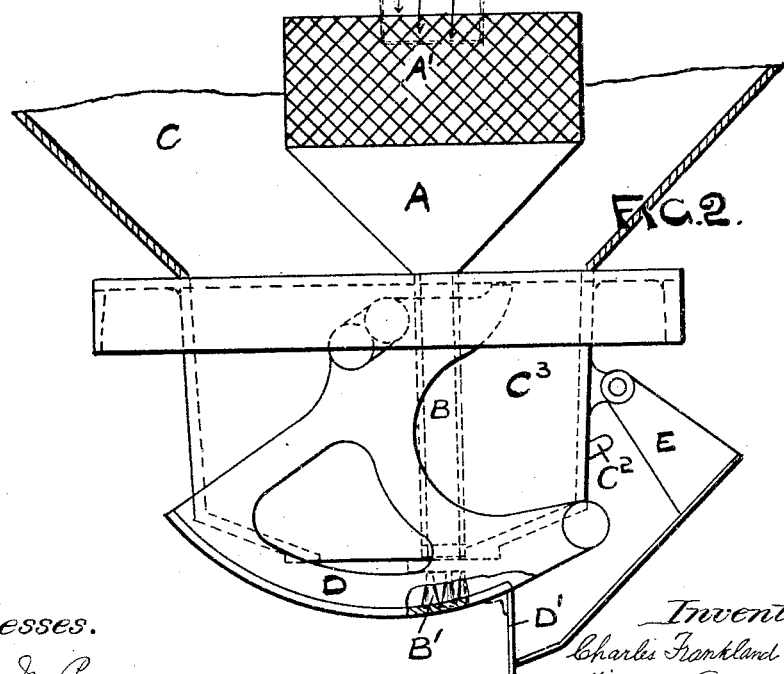

Figure 1 is a front elevation of our invention. Fig. 2 is a side elevation of our invention, showing the machine at rest. Fig. 3 is a side elevation showing our machine when the full supply is being delivered into the weigh-hopper. Fig. 4 is a side elevation showing our invention when the full supply has been reduced to a small stream or dribble. Figs. 5, 6, and 7 are side elevations showing another form of gate to be used in connection with the main and supplementary hoppers. Figs. 8 and 9 show the supplementary hopper detached in side and front elevations, respectively.

To accomplish our purpose, we form a supplementary hopper, which we preferably place inside the main supply-hopper above the machine. This supplementary hopper we form of any convenient shape and with sloping sides at a convenient angle and covered, preferably, with perforated lattice-work, the pitch of the interstices so arranged that it will allow the material to flow freely through the interstices forming the mesh, but will not allow any foreign substances—such as string, wood, iron, stones, or the like—to pass through into the interior of this supplementary hopper. The lower portion of the supplementary hopper is reduced in area and terminates in a hollow shaft or tube which continues down to the cut-off gate.

Assuming the machine is at rest, the supply of grain is allowed to fall upon the lattice-work top of the supplementary hopper and will pass through the interstices of the mesh and pour into the interior of the supplementary hopper until it is filled. The supply of material still flowing will then overflow into the main supply-hopper, and the main gate of the full flow being open the material will discharge into the weighing-hopper below. When by the action of the machine the main gate is closed and in closing pushes open the dribble-gate, the supply of grain in the supplementary hopper then comes into action, the outlet being unsealed by the opening of the dribble-gate, and a constant supply is assured at an equal pressure for the completion of the weighment. This supplementary hopper can be placed in any convenient position with relation to the main supply-hopper so that the overflow when the supplementary hopper is filled shall flow into the main supply-hopper, and so through the main gate into the weighing-hopper. The outlet of the supplementary hopper is arranged in direct communication with the dribble-gate. The addition of this supplementary or subsidiary hopper is equally applicable to automatic grain-weighing machines in which the main gate and the dribble-gate are actuated separately or to such machines in which the main flow and the dribble are controlled by a single gate provided with a small opening, which small opening comes into position by the cut-off of the main flow, so that the aperture is brought into position underneath the discharge-outlet of the supplementary hopper, so as to obtain the supply of material necessary for the dribble direct from the supplementary hopper, as afore described.

A represents the supplementary hopper, having a mesh A' fixed across the top to prevent foreign substances—such as string, wood, iron, or the like—from entering. At the base of the said hopper A is fixed a spout or tube B, which is carried inside the weighing-machine chute $C^3$. At the base of the said spout B is fixed a brush B', which seals the joint between the spout B and the main gate D of the weighing-machine. Fixed to the aforesaid chute $C^3$ and pivoted at C' is a small gate E, which is held in the position shown in Fig. 2 by the projection-piece D', fixed to the main gate D.

The action of our said invention is as follows: When the material is delivered to the large storage-hopper C, the smaller hopper A becomes first filled and overflows. The machine commences to work under the weight of the material in the main hopper, as is usual, and the main gate moves upward, and so allows the material to fall through the aperture in the chute $C^3$ to the weigh-hopper below. The opening of the main gate D allows the smaller gate E to fall until it cuts off the supply from the spout B of the supplementary hopper, the gate E being held from further forward movement by the stop $C^2$, fixed on the chute $C^3$. When nearly the required amount of material has passed through the chute $C^3$, the main gate D descends by the action of the machine in the usual manner, and in its descent the projection-piece D', fixed on the main gate D, strikes the smaller gate E, and thereby pushes it up, and so unseals the spout B of the supplementary hopper, thus insuring a sufficient and even flow of screened material to complete the weighing. During this operation the gate E rests against the projection-piece D' in such a manner that the material can only be supplied through the spout B, which material then passes through an aperture of the same area as the spout B in the main gate D. When the required amount has been obtained, the main gate D completes its descent by the action of the machine, carrying with it the smaller gate E until they assume the position shown in Fig. 2, thereby cutting off the dribble-supply from chute B.

In the modification shown in Figs. 5, 6, and 7 the hopper A is of the same description as in the arrangement aforesaid described in Figs. 2, 3, and 4, having the brush B' for the same purpose as already described. In our modification the smaller gate E is obviated and the entire arrangement worked by the main gate D. An aperture F is cut in the said gate D of the same area as the spout B and is arranged in such a position that the material will only deliver though this said aperture at a time when a diminished flow is required for completing the weighment. Fig. 5 shows the arrangement when the entire supply is cut off, the aperture F having passed the spout B and the brush B'. The plate F' covers this said aperture F from the chute $C^3$ of the main supply-hopper C. Fig. 6 shows the arrangement when the full supply is being delivered through the chute $C^3$, the aperture F being well past the spout B, the supply from which is cut off by the main gate D. Fig. 7 shows the supply being delivered only through the aperture F by the spout B at the time when the diminished flow or dribble is required.

The action of the modification of our said invention is as follows: When the machine commences to work, the main gate D is moved upward to the position shown in Fig. 6, and so allows the material to fall through the chute $C^3$, the material being prevented from delivering through the spout B by the portion $D^2$ of the gate D pressing against the brush B'. When nearly the required amount has been obtained, the flow is diminished to a small dribble by the main gate D descending by the action of the machine to the position shown in Fig. 7, and so cutting off the main supply through the chute $C^3$, and the aperture F is brought opposite the spout B, and so allows a diminished flow of material to pass. When the exact amount of material has been obtained, the gate D completes its descent, as shown in Fig. 5, and cuts off the supply through the chute B.

What we claim is—

1. In a feeding device for automatic weighing-machines for grain and the like, a means of supply for the material, a dribble supply-hopper in line therewith, a main supply-hopper adapted to receive the overflow from the dribble supply-hopper, independent discharge-spouts for said hoppers, and means for jointly closing and severally opening the discharge ends of said spouts.

2. In a feeding device for automatic weighing-machines for grain and the like, a means of supply for the material, a main supply-hopper adapted to receive the overflow from a dribble supply-hopper, a dribble supply-hopper within the main supply-hopper and in line with the means of supply, independent discharge-spouts for said hoppers, and means for jointly closing and severally opening the discharge ends of said spouts.

3. In a feeding device for automatic weighing-machines for grain and the like, a means of supply for the material, a main supply-hopper adapted to receive the overflow from a dribble supply-hopper, a dribble supply-hopper located substantially centrally within the main supply-hopper and in line with the means of supply, and means for controlling the discharge from said hoppers.

4. In a feeding device for automatic weighing-machines for grain and the like, a means of supply for the material, a main supply-hopper adapted to receive the overflow from a dribble supply-hopper, a dribble supply-hopper located substantially centrally within the main supply-hopper and in line with the means of supply, an inclined screen-top for the dribble-hopper and means for controlling the discharge from said hoppers.

5. In a feeding device for automatic weighing-machines for grain and the like, a means of supply for the material, a main supply-hopper adapted to receive the overflow from a dribble supply-hopper, a dribble supply-hopper located substantially centrally within the main supply-hopper and in line with the means of supply, a double inclined screen-top for the dribble-hopper, and means for controlling the discharge from said hoppers.

6. In a feeding device for automatic weighing-machines for grain and the like, a main supply-hopper, a dribble supply-hopper, independent discharge-spouts for said hoppers, and a single gate or valve adapted to move across the discharge ends of both of said spouts to control the discharge therefrom.

7. In a feeding device for automatic weighing-machines for grain and the like, a main supply-hopper, a dribble supply-hopper, independent discharge-spouts for said hoppers, and a single gate or valve adapted to close the discharge ends of both of said spouts jointly and to open each of the same severally.

8. In a feeding device for automatic weighing-machines for grain and the like, a main supply-hopper, a dribble supply-hopper, independent discharge-spouts for said hoppers, and a single gate or valve adapted to move across the discharge ends of both of said spouts and beyond the main discharge-spout, the said gate having an opening adapted to register with the discharge end of the dribble-spout in timed relation to the closing of the main discharge-spout.

In testimony whereof we affix our signatures in presence of two witnesses.

CHARLES FRANKLAND BEAKBANE.
    WILLIAM EDWARD HIPKINS.

Witnesses:
 HENRY GUY SILK,
 HENRY HERBERT OLIVER,